Figures 1, 2:
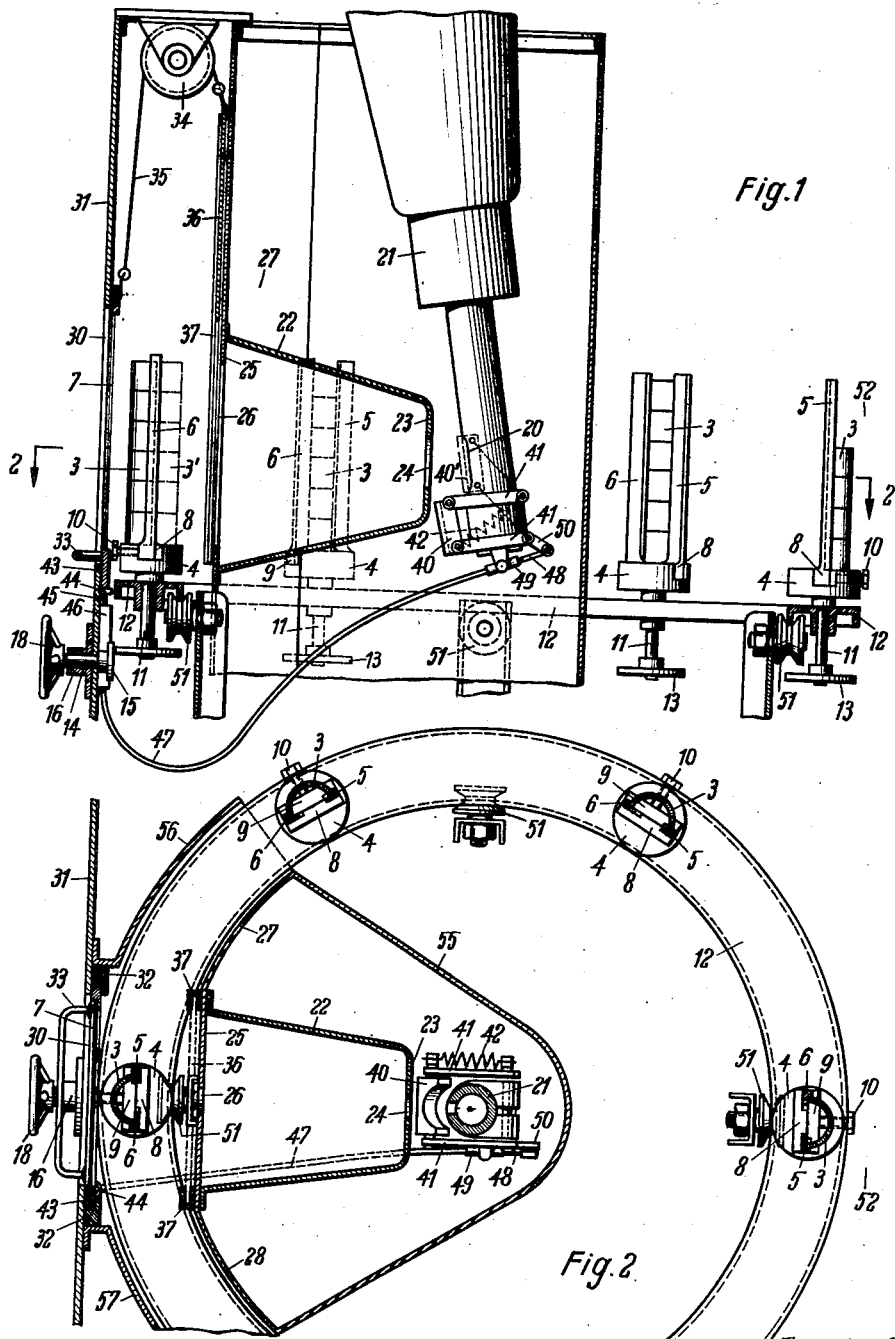

Aug. 24, 1954  E. L. H. PFAFF  2,687,477
DEVICE FOR X-RAY TESTING
Filed July 28, 1950

INVENTOR.
EGON L. H. PFAFF
By: Dicke and Padlon
ATTORNEYS

Patented Aug. 24, 1954

2,687,477

UNITED STATES PATENT OFFICE 2,687,477

DEVICE FOR X-RAY TESTING

Egon L. H. Pfaff, Stuttgart-Unterturkheim, Germany, assignor to Daimler-Benz Aktiengesellschaft, Stuttgart-Unterturkheim, Germany Application July 28, 1950, Serial No. 176,281

Claims priority, application Germany August 3, 1949

10 Claims. (Cl. 250—52)

1

The invention refers to a device for X-ray testing of metallic bodies, for example, of hemicylindrical lead bronze bearing parts.

It is one object of the invention to provide means for testing currently a large number of bodies, for example such bearing parts, within the shortest possible time and, if possible, without any cost for photographic material by using the direct X-ray translumination procedure. It is a further object of the invention to achieve the same reliability in the recognition of flaws as it is possible in the photographic exposure procedure.

It is a further object of the invention to make possible an easy, comfortable and fast operation on the part of the testing operator. Furthermore it must be possible while the testing of objects in the testing device is taking place to insert and remove other workpieces. Another object of the invention is to provide the simplest possible construction of the device, furthermore a reliable protection from radiation for the persons who operate the device.

In accordance with this it is a characteristic of the invention that the piece to be tested is arranged on a movable device, for example on a rotary plate, which permits bringing all the parts of the body to be tested one after the other into a position, which is approximately parallel to the image surface, for example of a screen serving for direct observation.

According to a further object of the invention a ray stop is arranged between the ray source, for example an X-ray tube, and the image surface, respectively the body to be tested, which at any time lays bare for radiation only that section of the body to be tested, which is aproximately parallel to the image surface.

The ray stop is desirably arranged in the front plate of a lead tubulus, which is directed toward the body to be tested, and in the rear end of which the X-rays enter from the ray source.

A further characteristic of the invention is the utilization of a transport device, which is movable between the ray source, respectively ray stop device on one hand and the image surface on the other hand, for example a rotary turret for the bodies to be tested, on which the bodies are arranged in such a manner that they can be turned or moved in any other way.

According to a further characteristic of the invention provision is made for driving members for the moveable bodies to be tested on the transport device, which is for example a turret ring which members move with the transport device and can be coupled with a fixed driving member in the testing position of the bodies to be tested, so that this can be utilized in the same manner for all devices for holding the bodies to be tested,

2 which can be turned and are arranged on the transport device.

According to a further characteristic of the invention the image surface can be removed from the range of the pencil of rays and a covering device is coupled with the image surface, through which the pencil of rays is covered automatically, when the image surface is removed from the range of the pencil of rays.

Other objects will appear from the following description of an illustrative embodiment of the invention taken together with the attached drawings wherein:

Figure 1 shows a translumination device partly in vertical longitudinal section, and Figure 2 shows a horizontal section through the device along the line 2—2 of Figure 1.

The metallic bushings 3 to be tested, for example lead bronze bearing bushings for combustion engines, are in the example of construction placed on a holding device in the form of a rotary plate arranged, say six one above the other, so that they form together a half cylinder with vertical longitudinal axis. The bushings are kept in that position while moved to the image plane, a fluorescent or image screen 7, which is necessary for translumination, by rigid rails 5, 6 of an angular cross-section. The rail 5 is rigidly connected to a slide bar 8, and the rail 6 is rigidly connected to a slide bar 9. The two slide bars are guided under contact of the surfaces in a square groove of the rotary plate, which is open at the top, so that they can be moved in radial direction upon loosening the set screw 10, in order to adapt the mutual distance of the rigid rails to the diameter of the shells to be tested in each case.

The plate 4 is carried for rotation on the vertical shaft 11 supported on the turret ring 12. The shaft 11 bears at its lower end a friction disk 13, which is rigidly connected to it, and which is at times in power transmitting contact with a second friction plate 15, which is fastened to the horizontal driving shaft 14. For this purpose the shaft 14 is axially moveable in its journal bearing 16. A helical spring, on the shaft 14 between the journal bearing and the friction plate 15, causes the plate 15 to bear against the plate 13 with the necessary pressure so that all sections of the bearing bushings 3, which are arranged on the rotary plate 4, can be brought to a position approximately parallel to the screen 7 by turning the hand wheel 18. Between the ray window 20 of a customary hollow anode X-ray tube 21 and the bearing bushings 3 to be tested a lead tubulus 22 of approximately rectangular cross-section, enlarged towards the front, is arranged, the rear wall 23 of which has an entrance port 24 for the X-rays emitted by the tube 21 opposite to the window 20 and approximately corresponding to it in size. The front plate 25 of the lead tubulus forms a slit stop, the slit 26 of which is rated in its breadth and height in such a manner that only that section of the bearing bushings is exposed to translumination, which is approximately parallel to the screen 7 in each case, while the other part of the rays, which enter the tubulus 22 through the opening 24 is retained by the lead walls of the latter. In order to collect also the laterally dispersed rays on their way between the tube 21 and the opening 24 and to thus make feasible a testing which is completely undisturbed and free from danger, the front wall 25 of the lead tubulus is broadened at 27 and 28 to both sides for a considerable distance.

The screen 7 covers an opening 30 in the front protection wall 31 of the device and is guided therein in ledges 32, so that it can be moved upwards by means of the handle 33, in order to permit the individual bearing bushings to be marked with a testing mark indicating defects exposed by their translumination. In order to avoid that the tester is exposed to the rays, which leave the slit 26, the screen 7 is connected to a sliding diaphragm by means of a rope 35 which is guided over the pulley 34. The sliding diaphragm 36 is guided in U-rails 37 and lowers automatically in front of the slit 26 by its weight, when the screen 7 is raised.

For safety reasons a further protection diaphragm 40, acting automatically as well, is arranged at the ray window 20 of the X-ray tube. The protection diaphragm 40, guide links by guide links 41 places itself before the ray window under the effect of the spring 42, when the screen 7 is raised (position 40').

When the screen 7 is lowered, a stop 44, which is arranged at its frame, presses down a pin 45, which is guided in a sleeve 46, which is fixed to the protection wall 31. The pin 45 forms one end of a Bowden cable 47. The other end of this Bowden cable is formed as a pin 48, which is guided in the sleeve 49, which is connected to the lower end of the tube in a rockable manner. When the pin 45 is pressed down, the pin 48 is pressed out of the sleeve 49 and swings hereby the lever 50, which is horizontally connected to it, in such a manner that the diaphragm 40 is swung against the effect of the spring 42 into the full line position and thus the way into the lead tubulus is rendered free for the rays. In order to make an operating of the device feasible, which is as fast as possible and without interruption, in the shown example of construction six rotary plates 4 are arranged in a circle on the turret ring 12, which is of U-shaped cross-section. This rotary ring is arranged for rotation on rolls 51, so that the individual rotary plates can be brought before the screen one after another like in a carrousel. Since each of the six rotary plates has its own friction plate 13, the latter forms automatically power connection with the driving disk 15, as soon as one of the rotary plates is located in front of the opening 26 of the slit stop.

The following procedure is followed: While the tester takes his place before the screen 7 after switching on the X-ray tube 21 and releases the flow of the rays through the lead tubulus 22 by pulling down the screen, a part of the rotary plates 4 had already been filled by an assistant sitting on the opposite side of the rotary rim 12 at 52 with bearing bushings to be tested. Thereupon the first of these rotary plates 4 is brought exactly before the opening 26 of the slit stop by turning the rim 12 and thereby the friction plate 13 of this rotary plate is coupled automatically with the driving disk 15. The turning of the rim 12 can be executed by the tester or the assistant by hand or by means of an electro-motor, whereby the rotary rim can automatically operate the circuit-breaker for the electro-motor, as soon as one of the rotary plates has arrived in front of the opening 26. While the ring 12 is held stationary, the tester rotates before his eyes in the X-ray picture the bearing bushings 3, which are supported on the rotary plates 4, by bringing one small section after another of same into a position parallel to the screen and simultaneously before the opening 26. Hereby flaws in the bearing bushings like cavities, lead eliquations, defective connection of the bronze casting with the supporting steel shell and the like can be determined with great accuracy, since any lateral illumination of the picture beside the sections to be tested at the moment is avoided by the lead tubulus and the slit stop and hereby these sections are shown more distinctly in the picture.

From whichever positon the tester starts, when he turns the bearing bushings, from the full line position 3 in Figure 1 or from the dotted line position 3', he receives a smaller section of the bushings in a larger or a broader section of same in a smaller scale on the screen. If necessary, the opening 26 of the slit stop can also be constructed adjustable in width for transluminating of a broader or smaller section of the bushings.

If the tester finds a flaw in one of the bearing bushings, he pulls up the screen 7, whereby the diaphragms 36 and 40 close automatically, and provides this bushing with a scrap mark. As soon as the bushings, which are located on one rotary plate, are tested, the next rotary plate with new bushings is moved before the opening 26 and those are tested, so that the tester can currently test a large number of bearing bushings in a relatively short time, without being detained by auxiliary work or being forced to leave his seat. Simultaneously the tested bushings are currently taken from the rotary plates, the deficient pieces are sorted out and new bushings are placed on the rotary plates by the assistant, who is sitting on the other side of the turret ring. In order to protect also the assistant from injury by dispersing radiation, further protection walls 55, 56, 57 are arranged around a part of the turret ring. If the number of the bearing bushings to be tested is not very great, the turret ring 12 can be omitted and only one rotary plate 4 can be arranged in a rigid pivot bearing before the opening 26, which is then charged by the tester himself.

Under X-rays in the sense of the invention all rays are to be understood, which are suitable for translumination of bodies.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

What I claim is:

1. Device for inspecting generally hemicylindrical bodies like bearing shells by means of X-rays, comprising a ray source, a slitted diaphragm which permits only a flat beam of rays to pass the diaphragm, an image surface placed in general perpendicular to the rays, a work holding device for the bodies to be tested arranged between the diaphragm and the image surface in such a manner that the axis of the bodies extends substantially parallel to the image surface, and a device for turning the holding device around an axis which is in general parallel to the image surface, so that the individual sections of the bodies to be tested are one after another brought into a position which is generally parallel to the image surface.

2. Device in accordance with claim 1, wherein the holding device comprises a rotary plate and retaining rails for the bodies, wherein the retaining rails run parallel to the rotation axis of the holding device and are shaped in such a manner that they can hold several bodies placed one above the other for simultaneous translumination.

3. Device for inspecting generally hemicylindrical bodies by means of X-rays, comprising a ray source, an image surface, a holding device for the bodies to be tested arranged between the ray source and the image surface and a rotary device for turning the holding device around an axis substantially parallel to the image surface, so that the individual sections of the bodies to be tested can one after another be brought into a position which is substantially parallel to the image surface, said rotary device comprising a rotary plate for holding the hemicylindrical bodies, a friction disk connected to and coaxial with said rotary plate, another friction disk in frictional engagement with the first-mentioned friction disk and means for driving the second-mentioned friction disk.

4. Device for inspecting hemicylindrical bodies by means of X-rays, comprising a ray source, a diaphragm, an aperture therein which permits only a narrowly limited pencil of rays to pass, an image surface placed generally perpendicular to the pencil of rays, a holding device for the bodies to be tested, arranged in the pencil of rays between the diaphragm and image plane, and a device for moving the holding device in such a manner that the individual sections of the bodies to be inspected can one after another be brought into a position which is substantially parallel to the image surface, wherein the X-ray source comprises an X-ray tube and a lead tubulus arranged between said tube and the body to be tested in which a ray aperture is arranged in the front wall of the lead tubulus facing the body to be inspected and an inlet opening for the rays is provided in the rear wall of the diaphragm opposite the ray aperture of the X-ray tube and of a size corresponding to it.

5. Device for inspecting generally hemicylindrical shells by means of X-rays, comprising a ray source, an image surface, a diaphragm device for the ray source having a slit so as to pass only a flat beam of rays from the source of rays to the image surface, a turret generally concentric to the ray source movable generally through the space between the diaphragm and the image surface, rotary plates for holding the shells to be tested, arranged on the circumference of the turret, means for turning the rotary turret and means for independently turning the rotary plates on the turret in such a manner that the bodies to be tested can one after the other be brought in front of the image surface by moving the turret, and the individual sections can be brought one after another into a position within the rays by rotating the rotary plates.

6. Device in accordance with claim 5, in combination with a frame for the image surface, and in which the means for turning the rotary plates comprises a driven member one for each rotary plate on the turret, and a driving member which is arranged near the frame, the driven member being adapted to be coupled to the driving member when its pertinent rotary plate is brought in place before the image surface.

7. Device in accordance with claim 5, in combination with a frame for the image surface, and in which the means for turning the rotary plates comprise a friction member, one each connected with each rotary plate and supported on the turret and a friction member arranged upon the frame, with which the first-mentioned friction member can be coupled when the pertinent rotary plate is brought before the image surface.

8. Device for inspecting transluminatable bodies, comprising an X-ray source, an image surface, a diaphragm, an aperture therein permitting a pencil of X-rays to be directed against the image surface, means for holding the bodies to be tested within the space between the diaphragm and the image surface, a device for moving the image surface out of place to give access to the body being inspected, a shield for cutting off the X-rays before their exit from the diaphragm aperture and means coupling the device for removing the image surface and the shield with each other in such a manner that upon the removal of the image surface the pencil of rays is cut off.

9. Device in accordance with claim 8, wherein the said shield comprises a slide closing the aperture in the diaphragm, and the mentioned coupling means comprise a rope connecting the image surface with the slide, and an elevated guide pulley for the rope so that during an upward movement of the image surface the said slide is moved downwardly and vice versa.

10. Device in accordance with claim 8, wherein said ray source comprises an X-ray tube having a ray window directed toward the image surface, and the said shield comprises a closure adapted to cover the ray window directly, guide members for the closure and elastic means by which the closure is moved into a position closing the ray window, and wherein the said coupling means comprise a Bowden wire connecting the image surface with the closure which opens the closure against the bias of said elastic means when the image surface is in working position.

References Cited in the file of this patent

UNITED STATES PATENTS

| Number | Name | Date |
| --- | --- | --- |
| 1,117,266 | Snook et al. | Nov. 17, 1914 |
| 1,617,758 | Heynemann | Feb. 15, 1927 |
| 1,809,078 | Smith | June 9, 1931 |
| 1,856,084 | Smith | May 3, 1932 |
| 2,058,826 | Reece | Oct. 27, 1936 |
| 2,099,185 | Adrian | Nov. 16, 1937 |
| 2,169,483 | Adrian | Aug. 15, 1939 |
| 2,175,617 | Rick | Oct. 10, 1939 |
| 2,217,262 | Tunnicliffe | Oct. 8, 1940 |

FOREIGN PATENTS

| Number | Country | Date |
| --- | --- | --- |
| 58,614 | Netherlands | Dec. 16, 1946 |
| 436,745 | Great Britain | Oct. 17, 1935 |
| 564,805 | Great Britain | Oct. 13, 1944 |
| 723,656 | Germany | of 1942 |